United States Patent [19]

Isogai et al.

[11] Patent Number: 4,550,134

[45] Date of Patent: Oct. 29, 1985

[54] POLYOLEFIN RESIN COMPOSITION

[75] Inventors: Osamu Isogai, Ichihara; Toshihumi Kagiya, Sodegaura, both of Japan

[73] Assignee: Idemitsu Petrochemical Co., Ltd., Tokyo, Japan

[21] Appl. No.: 644,784

[22] Filed: Aug. 27, 1984

[30] Foreign Application Priority Data

Sep. 13, 1983 [JP] Japan .................................. 58-167522

[51] Int. Cl.$^4$ ................................................ C08K 3/34
[52] U.S. Cl. ..................................... 524/413; 524/450; 524/451
[58] Field of Search ............... 524/413, 449, 450, 451; 428/34, 38; 106/291, 300, DIG. 3, 308 M; 523/216, 223

[56] References Cited

U.S. PATENT DOCUMENTS

| | | | |
|---|---|---|---|
| 3,819,566 | 6/1974 | Pinsky et al. | 524/449 |
| 4,038,099 | 7/1977 | DeLuca et al. | 106/291 |
| 4,134,776 | 1/1979 | Rieger et al. | 106/291 |
| 4,467,077 | 8/1984 | Meyer et al. | 524/449 |

FOREIGN PATENT DOCUMENTS 54-39451 3/1979 Japan .

OTHER PUBLICATIONS

H. W. Dell and R. Shutt "Graphitic Mica" Paint, Oil and Chemical Review, 12–18, Oct. 19, 1944.
W. S. Castor, Jr. and J. A. Manasso "Optical and Other Effects of White Pigments in Plastics"—233–248 of Additives for Plastics—vol. I, State of the Art, Raymond B. Seymeur Editor, Academic Press, 1978.

*Primary Examiner*—Veronica P. Hoke
*Attorney, Agent, or Firm*—Frishauf, Holtz, Goodman & Woodward

[57] ABSTRACT

Disclosed is a polyolefin resin composition which comprises 35 to 98% by weight of a polyolefin resin, 1 to 50% by weight of a muscovite and 1 to 50% by weight of titanium oxide. Also disclosed is another polyolefin resin composition which comprises further 0.5 to 40 parts by weight of a talc per 100 parts by weight of the resin composition defined above.

The polyolefin resin composition according to the present invention has excellent light-shielding properties, small specific gravity which contributes to lightening the weight, excellent shock resistance and stiffness balance as well as moldability when manufacturing articles such as electric parts and automobile parts.

15 Claims, 1 Drawing Figure

4,550,134

POLYOLEFIN RESIN COMPOSITION

BACKGROUND OF THE INVENTION

This invention relates to a polyolefin resin composition having excellent light-shielding properties, a small specific gravity, a good shock resistance, an excellent stiffness and a good fluidity at the time of molding.

In recent years, polyolefin resin compositions have been investigated as molding materials for electric parts andd automobile parts such as meter boxes, lamp housings and indicator panels for a variety of measuring instruments.

These parts in such fields are required to have betterments such as improved light utilization of a light source, a reduced consumption of electric power, and a less wall thickness and a lightened weight of the parts, therefore it is desired as properties of each molding material that light shielding properties are excellent and a specific gravity is small.

Further, in view of the fact that such parts are practically used after incorporated into various apparatuses or appliances, the molding articles are also required to be excellent in a shock resistance and a stiffness. Futhermore, from the viewpoint of a manufacturing process, it is also important that the molding material has a good fluidity and a sufficient moldability.

Considering the improved light shielding properties mentioned above, the molding material should have a white color rather than a chromatic color such as black color, because the white color is advantageously high in a light reflectance and is also excellent in the light shielding properties.

Thus, there is known a method in which a white pigment is blended with a molding material. In the case that such a white pigment is blended therewith, however, a great amount of the white pigment such as titanium oxide which is high in density and which is expensive is required in order to provide the molding material with the sufficient shielding properties. Therefore, such a method will make the weight of molded articles heavier and at the same time same time the cost of molded articles will become expensive, which facts are contrary to a contemplation of lightening the weight and are not preferable in view of cost.

A method has been suggested in which titanium oxide and talc are together blended with a material (Japanese Unexamined Patent Publication (KOKAI) No. 109235/1981), but sufficiently satisfactory results have not been obtained according to this method.

SUMMARY OF THE INVENTION

An object of this invention is to provide a polyolefin resin composition which can overcome the above-mentioned problem, namely, the polyolefin resin composition according to the present invention has excellent light-shielding properties as a matter of course and also has a small specific gravity which is contributable to lightening weight, and is excellent in shock resistance, stiffness balance and moldability at the time of the manufacture of parts.

DESCRIPTION OF THE PREFERRED EMBODIMENTS

Figure 1:
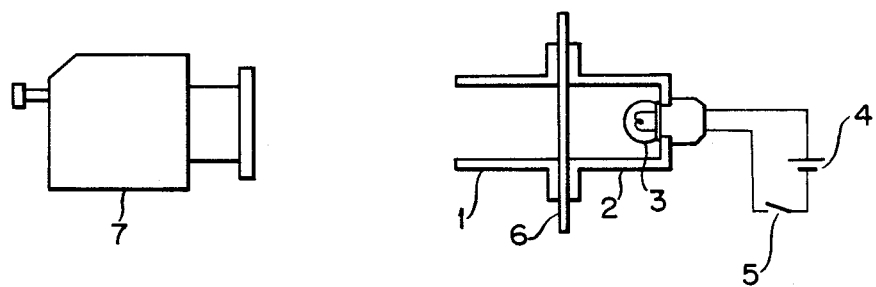
FIG. 1 is a schematic view illustrating one embodiment of an apparatus for measuring a luminance of transmitted light.

A resin composition of this invention is characterized by comprising 35 to 98% by weight of a polyolefin resin, 1 to 50% by weight of a muscovite and 1 to 50% by weight of titanium oxide, and other resin composition is also characterized by blending a talc with the above-mentioned composition in a proportion of 0.5 to 40 parts by weight per 100 parts by weight of the resin composition defined above.

Examples of the polyolefin resins which are fundamental components include homopolymers of and copolymers comprising suitable combinations of $\alpha$-olefins such as ethylene, propylene, butylene and styrene, and they are not particularly limited. Among these examples, polypropylenes and high-density polyethylenes are preferred. Especially preferred polyolefin resins are propylene homopolymers each having a fluidity of a melt index (MI) being 4 g per 10 minutes or more, above all, 6 to 50 g per 10 minutes, propylene block copolymers containing 15% by weight or less of ethylene, and high-density polyethylenes.

Such a polyolefin resin is blended in an amount of 35 to 98% by weight, preferably 45 to 80% by weight. When the blending amount of the polyolefin resin is less than 35% by weight, the resin composition will be poor in the moldability or processability, and molded articles will have the reduced shock resistance. On the other hand, when it is more than 98% by weight, the light-shielding properties of the resin composition will become poor.

The muscovites used in this invention are not particularly limited, but each of them preferably has an aspect ratio of 5 to 50, and a weight-average particle diameter of 150 $\mu$m or less. It is especially preferred that the muscovite possesses an aspect ratio of 10 to 30 and a weight-average particle diameter of 100 $\mu$m or less. When the aspect ratio is less than 5, the light-shielding properties will become poor. On the other hand, when it is more than 50, the shock resistance will be lowered.

The muscovite is blended with the resin composition in an amount of 1 to 50% by weight, preferably 3 to 45% by weight. When the blending amount of the muscovite is less than 1% by weight, the light-shelding properties of the resin composition will be lowered; when it is more than 50% by weight, the moldability or processability as well as the shock resistance of the resin composition will become poorer.

The titanium oxides used in this invention are not particularly limited, either. They may be manufactured by a known sulfuric acid method or chlorine method and with regard to their crystalline structures, both rutile and anatase types are acceptable. Especially, rutile crystals having a weight-average particle diameter of 0.12 to 0.35 $\mu$m, preferably of 0.18 to 0.30 $\mu$m are suitable or advantageous.

A blending amount of the titanium oxide is within the range of 1 to 50% by weight, preferably within the range of 3 to 45% by weight. When the blending amount of the titanium oxide is less than 1% by weight, the light-shielding properties of the resin composition will be poor; when it is more than 50% by weight, the moldability or processability as well as the shock resistance of the resin composition will be lowered.

In this invention, when the muscovite and the titanium oxide are blended with each other so as to satisfy the requirement that a weight ratio of them is within the range of 0.1 to 5.0, preferably 0.2 to 4.5, the prepared resin composition will have the noticeably improved light shielding properties and will be useful.

Further, another resin composition of this invention additionally includes a talc besides the above-mentioned three components. This talc contributes to the improvement of the whiteness and the shock resistance.

The talcs used in the invention are not especially limited, but preferably, they have a weight-average particle diameter of 6 μm or less, more preferably of 4 μm or less.

A blending amount of the talc is adjusted to within the range of 0.5 to 40 parts by weight, preferably 1 to 30 parts by weight based on 100 parts by weight of the resin composition comprising the above-mentioned three components. When the blending amount of the talc is less than 0.5 parts by weight, the above-mentioned improved effects will not appear remarkably; when is is more than 40 parts by weight, the deterioration in the moldability or processability and the shock resistance will be brought about, and an entire specific gravity of each molded article will be heightened, and hence the results are disadvantageous.

In the case of this resin composition, when a weight ratio between the total amount of the muscovite and the talc and the amount of the titanium oxide is within the range of 0.1 to 5.0, preferably 0.2 to 4.5, the prepared resin composition will have the noticeably improved light shielding properties and will thus be useful.

The resin composition of this invention can be manufactured by pre-blending predetermined amounts of the above-mentioned components by use of a Henschel mixer, a super mixer, a drum blender, or the like, and then melting and kneading the resulting blend by use of, for example, a Banbury mixer, a single-shaft or a multi-shaft extruder. In this case, with the materials, there may be blended various additives such as an oxidation inhibitor, an ultraviolet absorber, a metal-inactivating agent, a dispersant and a colorant, and various compounding ingredients such as rubbers and an inorganic reinforcing material.

The manufacture of appliance or automobile articles or parts having a predetermined shape from this resin composition can be accomplished by suitably selectively utilizing a molding process such as an injection molding process, an extrusion molding process, a compression molding process and a blow molding process.

EXAMPLES 1–56

The following three types of polyolefin resins were prepared:

Polyolefin A: A propylene homopolymer of an MI being 20 g per 10 minutes

Polyolefin B: An ethylene-propylene block copolymer in which the MI was 30 g per 10 minutes and the content of ethylene was 6% by weight Polyolefin C: A high-density polyethylene in which the MI was 6.5 g per 10 minutes and a density was 0.956

The following three types of muscovites were prepared:

Muscovite A: Aspect ratio 13, and weight-average particle diameter 16 μm (manufactured by Lepco Inc.; Muscovite K325A)

Muscovite B: Aspect ratio 35, and weight-average particle diameter 45 μm (manufactured by Lepco Inc.; Muscovite K200C)

Muscovite C: Aspect ratio 34, and weight-average particle diameter 190 μm (manufactured by Lepco Inc.; Muscovite K60)

The following three types of titanium oxides were prepared.

Titanium oxide A: A rutile titanium obtained by a chlorine method and having a weight-average particle diameter of 0.209 μm (manufactured by Ishihara Sangyo Co., Ltd.; CR60)

Titanium oxide B: A rutile titanium obtained by a sulfuric acid method and having a weight-average particle diameter of 0.213 μm (manufactured by Ishihara Sangyo Co., Ltd.; CR680)

Titanium oxide C: A rutile titanium obtained by the chlorine method and having a weight-average particle diameter of 0.254 μm (manufactured by Ishihara Sangyo Co., Ltd.; CR80)

The following three types of talcs were prepared.

Talc A: Weight-average particle diameter 1 μm (manufactured by Asada Seifun Co., Ltd.; MMR)

Talc B: Weight-average particle diameter 2 μm (manufactured by Asada Seifun Co., Ltd.; JA13R)

Talc C: Weight-average particle diameter 7 μm (manufactured by Asada Seifun Co., Ltd.)

The above-mentioned components were preblended with one another in blending proportions shown in the following Table 1 by the use of a Henschel mixer and were then melted and kneaded by a two-shaft kneader in order to prepare resin compositions.

These resin compositions were injection molded to prepare specimens being 62.5 mm in length, 12.7 mm in width and 3.2 mm in thickness, and specific gravities were measured in accordance with ASTMD792.

Further, specimens being 60 mm in length, 60 mm in width and 1.5 mm in thickness were prepared according to the same procedures by the injection molding, and light-shielding tests were carried out using these specimens.

For the light-shielding tests, a device shown in FIG. 1 was utilized. In this drawing, reference numeral 1 is a cylindrical specimen holder the inside surface of which is painted black for matting, numeral 2 is a cylindrical specimen holder the inside surface of which is painted white for matting, numeral 3 is an electric bulb of 12 V and 3.5 W, numeral 4 is an electric source (12 V), numeral 5 is a switch and numeral 6 is the specimen. Moreover, reference numeral 7 is a luminance meter (manufactured by Toyko Kogaku Kikai Co., Ltd.; TOPC ON-BM-5), and the luminance meter is disposed at a position 200 mm away from the specimen.

The shown device was placed in a dark room and the electric bulb was lighted, and a luminance of the light transmitted through the specimen was measured by the luminance meter 7. A unit of this transmitted light luminance is cd·m$^{-2}$.

Further, for the specimens which had been employed for the specific gravity measurement, the Izod impact test was carried out without notch in accordance with ASTMD256.

Blending proportions of resin composition are shown in Table 1 and results obtained are set forth in Table 2.

TABLE 1

| | Blending proportion of resin composition | | | | | | | | Muscovite | Muscovite + Talc |
|---|---|---|---|---|---|---|---|---|---|---|
| | Polyolefin | | Muscovite | | Titanium | | Talc | | TiO$_2$ | TiO$_2$ |
| | Type | Parts by weight | Type | Parts by weight | Type | Parts by weight | Type | Parts by weight | (wt. ratio) | (wt. ratio) |
| Example No. | | | | | | | | | | |
| 1 | A | 80 | A | 11 | A | 9 | — | — | 1.2 | — |
| 2 | A | 80 | A | 6 | A | 14 | — | — | 0.4 | — |
| 3 | A | 65 | A | 28 | A | 7 | — | — | 4.0 | — |
| 4 | A | 65 | A | 20 | A | 15 | — | — | 1.3 | — |
| 5 | A | 65 | A | 10 | A | 25 | — | — | 0.4 | — |
| 6 | A | 50 | A | 39 | A | 11 | — | — | 3.5 | — |
| 7 | A | 50 | A | 29 | A | 21 | — | — | 1.4 | — |
| 8 | A | 50 | A | 14 | A | 36 | — | — | 0.4 | — |
| 9 | A | 80 | A | 11 | B | 9 | — | — | 1.2 | — |
| 10 | A | 65 | A | 20 | B | 15 | — | — | 1.3 | — |
| 11 | A | 50 | A | 29 | B | 21 | — | — | 1.4 | — |
| 12 | A | 80 | A | 11 | C | 9 | — | — | 1.2 | — |
| 13 | A | 65 | A | 20 | C | 15 | — | — | 1.3 | — |
| 14 | A | 50 | A | 29 | C | 21 | — | — | 1.4 | — |
| 15 | A | 80 | B | 11 | A | 9 | — | — | 1.2 | — |
| 16 | A | 65 | B | 20 | A | 15 | — | — | 1.3 | — |
| 17 | A | 50 | B | 29 | A | 21 | — | — | 1.4 | — |
| 18 | A | 80 | B | 11 | C | 9 | — | — | 1.2 | — |
| 19 | A | 65 | B | 20 | C | 15 | — | — | 1.3 | — |
| 20 | A | 50 | B | 29 | C | 21 | — | — | 1.4 | — |
| 21 | A | 80 | C | 11 | A | 9 | — | — | 1.2 | — |
| 22 | A | 65 | C | 20 | A | 15 | — | — | 1.3 | — |
| 23 | A | 50 | C | 29 | A | 21 | — | — | 1.4 | — |
| 24 | B | 80 | A | 11 | A | 9 | — | — | 1.2 | — |
| 25 | B | 65 | A | 20 | A | 15 | — | — | 1.3 | — |
| 26 | B | 50 | A | 29 | A | 21 | — | — | 1.4 | — |
| 27 | B | 80 | B | 11 | A | 9 | — | — | 1.2 | — |
| 28 | B | 65 | B | 20 | A | 15 | — | — | 1.3 | — |
| 29 | B | 50 | B | 29 | A | 21 | — | — | 1.4 | — |
| 30 | C | 80 | A | 11 | A | 9 | — | — | 1.2 | — |
| 31 | C | 65 | A | 20 | A | 15 | — | — | 1.3 | — |
| 32 | C | 50 | A | 29 | A | 21 | — | — | 1.4 | — |
| 33 | A | 80 | A | 8 | A | 9 | A | 3 | 0.9 | 1.4 |
| 34 | A | 80 | A | 6 | A | 9 | A | 5 | 0.7 | 1.4 |
| 35 | A | 80 | A | 3 | A | 9 | A | 8 | 0.3 | 1.4 |
| 36 | A | 65 | A | 15 | A | 15 | A | 5 | 1.0 | 1.3 |
| 37 | A | 65 | A | 10 | A | 15 | A | 10 | 0.7 | 1.3 |
| 38 | A | 65 | A | 5 | A | 15 | A | 15 | 0.3 | 1.3 |
| 39 | A | 65 | A | 5 | A | 25 | A | 5 | 0.2 | 0.4 |
| 40 | A | 50 | A | 22 | A | 21 | A | 7 | 1.0 | 1.4 |
| 41 | A | 50 | A | 15 | A | 21 | A | 14 | 0.7 | 1.4 |
| 42 | A | 50 | A | 7 | A | 21 | A | 22 | 0.3 | 1.4 |
| 43 | A | 80 | A | 3 | A | 9 | B | 8 | 0.3 | 1.4 |
| 44 | A | 65 | A | 5 | A | 15 | B | 15 | 0.3 | 1.3 |
| 45 | A | 50 | A | 7 | A | 21 | B | 22 | 0.3 | 1.4 |
| 46 | A | 65 | A | 5 | A | 15 | C | 15 | 0.3 | 1.3 |
| 47 | A | 65 | B | 5 | A | 15 | A | 15 | 0.3 | 1.3 |
| 48 | A | 65 | C | 5 | A | 15 | A | 15 | 0.3 | 1.3 |
| 49 | B | 65 | A | 5 | A | 15 | A | 15 | 0.3 | 1.3 |
| 50 | B | 65 | A | 5 | B | 15 | A | 15 | 0.3 | 1.3 |
| 51 | B | 65 | A | 5 | C | 15 | A | 15 | 0.3 | 1.3 |
| 52 | B | 65 | B | 5 | A | 15 | A | 15 | 0.3 | 1.3 |
| 53 | B | 65 | C | 5 | A | 15 | A | 15 | 0.3 | 1.3 |
| 54 | C | 65 | A | 5 | A | 15 | A | 15 | 0.3 | 1.3 |
| 55 | C | 65 | B | 5 | A | 15 | A | 15 | 0.3 | 1.3 |
| 56 | C | 65 | C | 5 | A | 15 | A | 15 | 0.3 | 1.3 |
| Comparative Example No. | | | | | | | | | | |
| 1 | A | 65 | — | — | A | 35 | — | — | — | — |
| 2 | A | 65 | — | — | B | 35 | — | — | — | — |
| 3 | A | 65 | — | — | C | 35 | — | — | — | — |
| 4 | A | 80 | — | — | A | 9 | A | 11 | — | — |
| 5 | A | 65 | — | — | A | 15 | A | 20 | — | — |
| 6 | A | 50 | — | — | A | 21 | A | 29 | — | — |
| 7 | A | 65 | — | — | A | 15 | B | 20 | — | — |
| 8 | A | 65 | — | — | A | 15 | C | 20 | — | — |
| 9 | A | 65 | A | 35 | — | — | — | — | — | — |
| 10 | A | 65 | B | 35 | — | — | — | — | — | — |
| 11 | A | 65 | C | 35 | — | — | — | — | — | — |
| 12 | A | 30 | A | 20 | A | 50 | — | — | 0.4 | — |
| 13 | A | 40 | A | 55 | A | 5 | — | — | 11.0 | — |
| 14 | A | 40 | A | 5 | A | 55 | — | — | 0.1 | — |
| 15 | B | 65 | A | 35 | — | — | — | — | — | — |
| 16 | C | 65 | A | 35 | — | — | — | — | — | — |

TABLE 1-continued

| | | | | | | | | | |
|---|---|---|---|---|---|---|---|---|---|
| | Blending proportion of resin composition | | | | | | | | |
| | Polyolefin | | Muscovite | | Titanium | | Talc | Muscovite | Muscovite + Talc |
| | Type | Parts by weight | Type | Parts by weight | Type | Parts by weight | Type | Parts by weight | $TiO_2$ (wt. ratio) | $TiO_2$ (wt. ratio) |
| 17 | A | 65 | A | 20 | A | 15 | A | 50 | 1.3 | 4.6 |
| 18 | A | 50 | A | 29 | A | 21 | A | 50 | 1.4 | 3.8 |

TABLE 2

| | Physical properties | | |
|---|---|---|---|
| | Specific gravity | Specimen-transmitted light luminance (cd · m$^{-2}$) | Izod impact strength (kg · cm/cm$^2$) |
| Example No. | | | |
| 1 | 1.051 | 21.7 | 44.5 |
| 2 | 1.059 | 2.46 | 43.4 |
| 3 | 1.187 | 0.0563 | 35.1 |
| 4 | 1.202 | 0.0003 | 37.4 |
| 5 | 1.221 | 0.0004 | 39.2 |
| 6 | 1.377 | 0.0049 | 21.0 |
| 7 | 1.403 | 0.0002 | 24.7 |
| 8 | 1.443 | 0.0002 | 26.9 |
| 9 | 1.051 | 19.8 | 43.9 |
| 10 | 1.202 | 0.0004 | 36.8 |
| 11 | 1.403 | 0.0002 | 26.3 |
| 12 | 1.051 | 37.4 | 41.5 |
| 13 | 1.202 | 0.0014 | 36.0 |
| 14 | 1.403 | 0.0009 | 23.4 |
| 15 | 1.051 | 46.2 | 42.8 |
| 16 | 1.202 | 0.0008 | 37.9 |
| 17 | 1.403 | 0.0003 | 21.8 |
| 18 | 1.051 | 72.8 | 41.7 |
| 19 | 1.202 | 0.0063 | 38.0 |
| 20 | 1.403 | 0.0018 | 22.6 |
| 21 | 1.051 | 92.6 | 39.9 |
| 22 | 1.202 | 0.0082 | 34.3 |
| 23 | 1.403 | 0.0017 | 19.0 |
| 24 | 1.051 | 26.7 | 56.2 |
| 25 | 1.202 | 0.0004 | 45.7 |
| 26 | 1.403 | 0.0002 | 33.1 |
| 27 | 1.051 | 51.8 | 54.2 |
| 28 | 1.202 | 0.0010 | 43.0 |
| 29 | 1.403 | 0.0002 | 31.6 |
| 30 | 1.051 | 17.6 | — |
| 31 | 1.202 | 0.0002 | — |
| 32 | 1.403 | 0.0002 | — |
| 33 | 1.051 | 24.6 | 45.0 |
| 34 | 1.051 | 21.8 | 45.5 |
| 35 | 1.051 | 23.2 | 47.1 |
| 36 | 1.202 | 0.0003 | 38.6 |
| 37 | 1.202 | 0.0003 | 39.3 |
| 38 | 1.202 | 0.0004 | 40.1 |
| 39 | 1.221 | 0.0004 | 40.3 |
| 40 | 1.403 | 0.0002 | 24.5 |
| 41 | 1.403 | 0.0002 | 25.0 |
| 42 | 1.403 | 0.0002 | 25.8 |
| 43 | 1.051 | 34.6 | 45.9 |
| 44 | 1.202 | 0.0006 | 39.3 |
| 45 | 1.403 | 0.0003 | 23.6 |
| 46 | 1.202 | 0.0172 | 38.5 |
| 47 | 1.202 | 0.0018 | 38.7 |
| 48 | 1.202 | 0.0109 | 33.0 |
| 49 | 1.202 | 0.0005 | 48.3 |
| 50 | 1.202 | 0.0005 | 48.0 |
| 51 | 1.202 | 0.0008 | 47.6 |
| 52 | 1.202 | 0.0023 | 46.1 |
| 53 | 1.202 | 0.0091 | 41.2 |
| 54 | 1.202 | 0.0004 | — |
| 55 | 1.202 | 0.0006 | — |
| 56 | 1.202 | 0.0072 | — |
| Comparative Example No. | | | |
| 1 | 1.241 | 0.0043 | 44.6 |
| 2 | 1.241 | 0.0051 | 43.9 |
| 3 | 1.241 | 0.0735 | 44.0 |
| 4 | 1.051 | 73.6 | 46.8 |
| 5 | 1.202 | 0.0647 | 41.7 |
| 6 | 1.403 | 0.0023 | 25.7 |
| 7 | 1.202 | 0.0931 | 40.0 |
| 8 | 1.202 | 0.785 | 38.7 |
| 9 | 1.174 | 1420 | 35.2 |
| 10 | 1.174 | 1580 | 33.5 |
| 11 | 1.174 | 2130 | 31.4 |
| 12 | 1.899 | 0.0001 | 11.7 |
| 13 | 1.515 | 9.34 | 16.2 |
| 14 | 1.684 | 0.0001 | 18.5 |
| 15 | 1.174 | 1210 | 42.1 |
| 16 | 1.174 | 970 | — |
| 17 | 1.475 | 0.0001 | 19.4 |
| 18 | 1.670 | 0.0001 | 12.7 |

As is apparent from the results shown in the above Table 2, when, for example, Example 4 is compared with Comparative Examples 1, 5 and 9, it will be definite that the composition in which the muscovite and titanium dioxide are employed together has the improved light shielding properties, the small specific gravity and thus a lightened weight. Further, by comparing Examples 36, 37 and 38 with Comparative Example 5, is will be understood that blending a small amount of the muscovite into the titanium dioxide-talc system leads to the noticeable improvement in the light shielding properties.

In consequence, the resin composition of this invention is excellent in the light shielding properties, the shock resistance and the stiffness balance, and has the small specific gravity. Therefore, this resin composition is useful as molding materials for appliance and automobile parts such as a variety of indicator panels.

We claim:

1. A polyolefin resin composition which comprises 45 to 80% by weight of a polyolefin resin, 3 to 45% by weight of a muscovite having an aspect ratio of 5 to 50 and a weight-average particle diameter of 150 μm or less; and 1 to 50% by weight of titanium oxide; the weight ratio of said muscovite and said titanium oxide being from 0.1 to 5.0.

2. The polyolefin resin composition according to claim 1, wherein the aspect ratio is 10 to 30 and the weight-average particle diameter is 100 μm or less; said titanium oxide is in an amount of 3 to 45% by weight; and wherein the weight ratio of said muscovite and said titanium oxide is within the range of 0.2 to 4.5.

3. The polyolefin resin composition according to claim 2, wherein said polyolefin resins are propylene homopolymers; propylene block copolymers containing 15% by weight or less of ethylene; or high-density polyethylenes each having a fluidity of a melt index (MI) of 6 to 50 g per 10 minutes.

4. The polyolefin resin composition according to claim 1, wherein the aspect ratio is 10 to 30 and the weight-average particle diameter is 100 μm or less.

5. The polyolefin resin composition according to claim 1, wherein said polyolefin resins are selected from homopolymers of and copolymers of ethylene, propylene, butylene and styrene.

6. The polyolefin resin composition according to claim 5, wherein said polyolefin resins are polypropylenes or high-density polyethylenes.

7. The polyolefin resin composition according to claim 6, wherein said polyolefin resins are propylene homopolymers; propylene block copolymers containing 15% by weight or less of ethylene; or high-density polyethylenes each having a fluidity of a melt index (MI) of 4 g or more per 10 minutes.

8. The polyolefin resin composition according to claim 7, wherein said polyolefin resins have a fluidity of a melt index (MI) of 6 to 50 g per 10 minutes.

9. The polyolefin resin composition according to claim 1, wherein said titanium oxide is in an amount of 3 to 45% by weight.

10. A polyolefin resin composition according to claim 1 which comprises further 0.5 to 40 parts by weight of a talc per 100 parts by weight of said resin composition.

11. The polyolefin resin composition according to claim 10, wherein said talc is blended in an amount of 1 to 30 part by weight.

12. The polyolefin resin composition according to claim 11, wherein the weight ratio between the total amount of said muscovite and said talc and the amount of said titanium oxide is within the range of 0.2 to 4.5.

13. The polyolefin resin composition according to claim 12, wherein the aspect ratio is 10 to 30 and the weight-average particle diameter is 100 μm or less; said titanium oxide is in an amount of 3 to 45% by weight; and wherein the weight ratio of said muscovite and said titanium oxide is within the range of 0.2 to 4.5.

14. The polyolefin resin composition according to claim 13, wherein said polyolefin resins are polypropylenes or high-density polyethylenes.

15. The polyolefin resin composition according to claim 10, wherein the aspect ratio is 10 to 30 and the weight-average particle diameter is 100 μm or less; said titanium oxide is in an amount of 3 to 45% by weight; and wherein the weight ratio of said muscovite and said titanium oxide is within the range of 0.2 to 4.5.

* * * * *